Sept. 29, 1931. C. J. ZINK 1,825,296
BRAKE
Filed July 30, 1928
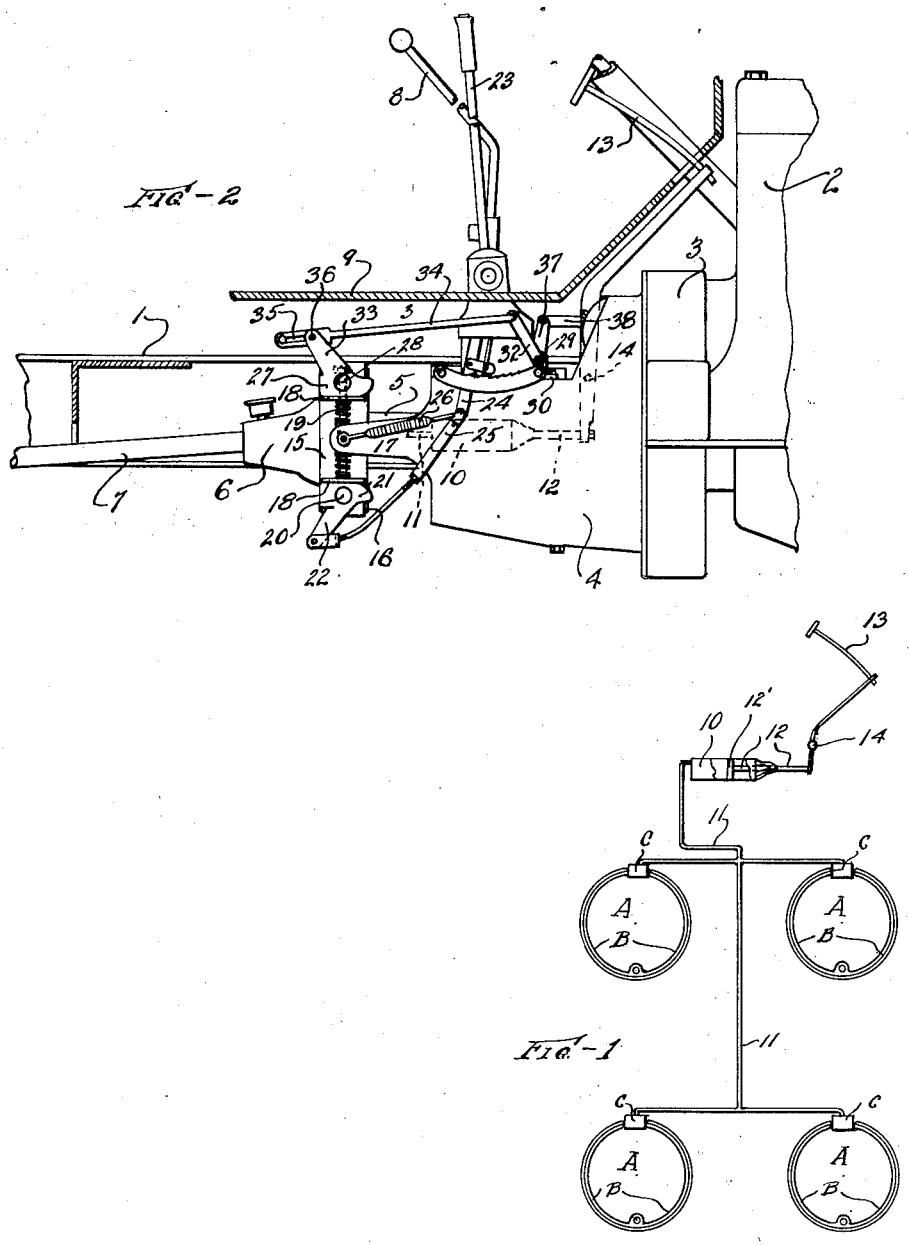
INVENTOR
CARL J. ZINK
Frank R. Higley
ATTORNEY Patented Sept. 29, 1931

1,825,296

UNITED STATES PATENT OFFICE

CLIFFORD J. ZINK, OF CLEVELAND, OHIO

BRAKE

Application filed July 30, 1928. Serial No. 296,259.

This invention relates to brakes for automotive vehicles and more particularly has to do with brake control means in such vehicles equipped with hydraulic service braking systems and separate emergency brakes.

In the present state of the art a hydraulic service braking system includes a master cylinder, a number of brake actuating cylinders each having a piston associated with one of the wheel brake bands, conduit connections between the master cylinder and the brake actuating cylinders, and means such as the usual pedal associated with the master cylinder for actuating the same. The cylinders and conduits described being maintained filled with a liquid, depression upon the pedal causes the liquid to flow from the master cylinder into the brake actuating cylinders to move the pistons thereof and apply all of the brake bands with equalized force.

Such a system has many advantages, but one serious disadvantage owing to its liability to failure should a leak occur at any point. Such liability is all the more dangerous owing to the likelihood of a leak when the service brake is most needed, as upon bursting of one of the conduits by undue sudden pressure upon the pedal.

An emergency or parking brake is usually provided which may, of course, be used upon failure of the service brake system. However, the emergency brake being ordinarily arranged for operation by a hand lever and thus requiring for its application a decidedly different operation from that required in applying the emergency brake, should the service braking system fail in a crucial instance as described and particularly should the driver even momentarily lose his head, so to speak, very disastrous consequences might result in the interval between failure of the service braking system and application of the emergency brake.

My invention contemplates so associating the hydraulic braking system operating means and the emergency brake that the emergency brake while effectively not interconnected under ordinary circumstances, will be, nevertheless, automatically applied in the event of failure of the hydraulic braking system, by substantially normal operation of the pedal or other operating member of the hydraulic braking system.

In automotive vehicles in which hydraulic braking systems are incorporated it is customary to locate the emergency brake immediately rearward of the transmission, and in substantially all automotive vehicles the transmission is located immediately back of the engine and the gear box therefor has mounted thereon the gear shifting lever, the emergency brake lever and the service brake pedal.

It is a further object of my invention to take advantage of this usual arrangement of parts for providing the described interconnection in the simplest possible manner and requiring as little departure from the customary design as possible.

Further objects and advantages of my invention will be apparent from the following description taken in connection with the accompanying drawings in which Fig. 1 is a diagrammatic showing of a typical four-wheel hydraulic braking system; and Fig. 2 is an elevation partly in section of pertinent parts of an automotive vehicle showing an application of my invention thereto.

With reference now to Fig. 1 of the drawings, for each of the four wheels of the vehicle is provided a so-called internally expanding brake band A, each band comprising a pair of brake shoes B fitting within a brake drum carried by the wheel. Between the free ends of each pair of shoes B is a cylinder C. The cylinders C are interconnected by a supply conduit 11 as indicated, this conduit 11 having connection with a master cylinder 10. A piston 12' is fitted in the master cylinder the piston rod 12 thereof extending to connection with the lower end of the service brake pedal 13 mounted for pivotal movement on a stud 14. Assuming the system including the master cylinder 10, the conduit 11 and the brake cylinders C filled with a non-expansible fluid and that each of the cylinders C has a pair of pistons free to move therein and each bears upon an adjacent end of one of the brake shoes B, it will be apparent that pressure upon the pedal 13 will be moving the piston 12' inwards of the cylinder 10 decrease the volume therein and force fluid through the conduits 11 equally into the cylinders C; and that the pistons in each cylinder C will be thereby moved from each other similarly moving the free ends of their corresponding braking shoes; the net result being that all four wheels of the vehicle are braked.

With reference now to the drawings, 1 is the frame of the vehicle in which is mounted the engine 2 to the flywheel casing 3 of which is bolted the transmission or gear box 4. A drive shaft 5 extends rearwardly of the transmission and has connection by a universal joint 6 with the propeller shaft 7. The usual gear shift lever 8 is mounted upon the transmission and projects upwards therefrom through the floor board 9.

Upon the transmission is also mounted the master cylinder 10 of the hydraulic braking system, the master cylinder having connection as by the conduit 11 with the several brake cylinders not shown, but which will be well understood by one familiar with the art. A piston is arranged as usual to move in the master cylinder, the piston rod 12 extending therefrom and having connection with the brake pedal 13 which is movable about the stud 14, whereby depression of the brake pedal by the operator of the vehicle will force the master cylinder piston into the master cylinder and force fluid therefrom by way of the conduit 11 into the brake cylinders to apply the brakes.

Upon the drive shaft 5 is an emergency brake drum 15 adapted to receive the emergency brake band 16 which is normally supported in non-braking relation upon the yoke 17. The ends of the emergency brake band carry suitable brackets 18 through which passes a bolt 19, the bolt carrying upon one end a stud 20 and, in the ordinary construction, being secured at its opposite end with the corresponding bracket 18. Upon the stud 20 is mounted a cam 21 in abutting relation with adjacent bracket 18 and having an actuating arm 22.

On the transmission is also mounted an emergency brake lever 23 having a downwardly projecting arm 24 which is in connection by the link 25 with the arm 22 of the cam 21. A spring 26 is arranged as indicated to urge the emergency brake lever 23 toward non-braking position. It will be apparent that a rearward motion of the lever, however, will move the link 25 forward, rotate the cam 21 in counter-clockwise direction, Fig. 1, and apply the band 16 upon the drum 15.

According to my invention I provide a second cam 27 which may be similar to the cam 21 and may conveniently be located upon a stud 28 similar to the stud 20 but upon the opposite end of the bolt 19, and hence adapted when moved in a clockwise direction, Fig. 2, to apply the emergency brake band.

Across the transmission I arrange a rock shaft 29 as mounted on brackets 30 secured with the transmission, and having its end bearing in a suitable bracket secured with the side member of the frame 1. The rock shaft 29 carries at one end a lever arm 32. This lever arm has connection with the lever arm 33 of the cam 27 as by a link 34 slotted as at 35 to receive a pin 36 with lost motion connection. The rock shaft 29 also carries substantially in the plane of the service brake pedal 13 a lever arm 37 having connection with the service brake pedal by means of a link 38.

The construction and arrangement of parts is such that normal depression of the service brake pedal to apply the service brake moves the link 34 an amount insufficient to cause engagement thereof with the pin 36, so that the emergency brake is not affected. However, further depression of the pedal, as allowed upon failure of the service brake to operate due to a serious leakage in the system, will cause the pin 36 to be engaged by the end of the slotted link 34, move the cam 27 in clockwise direction, Fig. 2, and thus automatically apply the emergency brake by the additional described actuating means and entirely independent of its normal operation by the primary actuating means including the opposite cam 21 actuated by the emergency brake lever 23.

What I claim is:

In an automotive vehicle having a hydraulic braking system and an emergency brake, said brake having a brakeband, operator-operated means associated with one end of said band for applying the emergency brake, control means for said system, and a lost motion connection between said control means and the other end of said emergency brake band adapted for brake-applying actuation of the latter by operation of the former upon failure of said hydraulic system.

Signed by me this 20th day of July, 1928.

CLIFFORD J. ZINK.